US009789729B2

(12) United States Patent
Anderson

(10) Patent No.: US 9,789,729 B2
(45) Date of Patent: Oct. 17, 2017

(54) WHEELS HAVING MULTIPLE-PIECE COMPOSITE STRUCTURES

(71) Applicant: SWIFT ENGINEERING, INC., San Clemente, CA (US)

(72) Inventor: Kai Anderson, San Clemente, CA (US)

(73) Assignee: SWIFT ENGINEERING, INC., San Clemente, CA (US)

( * ) Notice: Subject to any disclaimer, the term of this patent is extended or adjusted under 35 U.S.C. 154(b) by 0 days.

(21) Appl. No.: 15/073,604

(22) Filed: Mar. 17, 2016

(65) Prior Publication Data
US 2017/0267022 A1 Sep. 21, 2017

(51) Int. Cl.
B60B 23/04 (2006.01)
B60B 23/06 (2006.01)
B60B 1/06 (2006.01)
B60B 1/14 (2006.01)
B60B 1/12 (2006.01)
B60B 3/04 (2006.01)

(52) U.S. Cl.
CPC ............... B60B 23/06 (2013.01); B60B 1/06 (2013.01); B60B 1/12 (2013.01); B60B 1/14 (2013.01); B60B 3/04 (2013.01); B60B 2900/111 (2013.01); B60B 2900/112 (2013.01)

(58) Field of Classification Search
CPC ......... B60B 23/00; B60B 23/04; B60B 23/06; B60B 25/00; B60B 3/04; B60B 3/041; B60B 3/044; B60B 3/10
USPC .............................. 301/10.1, 11.1, 12.1–12.2, 301/63.101–63.102, 64.101, 64.307, 301/63.106, 95.1, 99, 95.104–95.107, 301/95.109
See application file for complete search history.

(56) References Cited

U.S. PATENT DOCUMENTS 1,805,036 A * 5/1931 Burdette ................. B60B 23/10
152/152
1,835,038 A * 12/1931 Gillam .................... B60B 23/10
152/152

(Continued)

FOREIGN PATENT DOCUMENTS

CH 344318 A 1/1960
DE 2654733 A1 6/1978
JP 05-24405 * 2/1993 ............. B60B 25/02

OTHER PUBLICATIONS

Auto News & Trends, Wheel Tech: 3 Piece Wheel Mounting Types, http://www.autonewstrends.com/wheel-tech-3-piece-wheel-mounting-types, Oct. 8, 2012.

(Continued)

Primary Examiner — Jason Bellinger
(74) Attorney, Agent, or Firm — Perkins Coie LLP

(57) ABSTRACT

A wheel includes a first hoop attached to a second hoop about a circumferential interface. The first and second hoops form at least part of an enclosed box structure positioned circumferentially around the wheel and adjacent to an outboard side of the wheel. The box structure may be formed at least in part by circumferential projections of the first hoop and the second hoop. The wheel may also include a central hub that optionally includes spokes. In some embodiments, the central hub may form part of the enclosed box structure. In some embodiments, a first hoop portion and a second hoop portion may be integral or unitary, with a box structure integrally formed between the hoop portions.

9 Claims, 16 Drawing Sheets

(56) References Cited

U.S. PATENT DOCUMENTS

| | | | |
|---|---|---|---|
| 2,252,163 | A | 8/1941 | Burger |
| 3,399,930 | A | 9/1968 | Bennett |
| 4,253,514 | A * | 3/1981 | Imamura .................. B60B 25/22 |
| | | | 152/379.3 |
| 4,286,825 | A * | 9/1981 | Sieving .................... B60B 21/02 |
| | | | 301/63.104 |
| 4,466,670 | A * | 8/1984 | Kaji ........................ B60B 25/22 |
| | | | 152/398 |
| 4,770,220 | A | 9/1988 | Mori et al. |
| 4,838,616 | A * | 6/1989 | Koch ....................... B60B 3/002 |
| | | | 301/10.1 |
| 4,997,235 | A | 3/1991 | Braungart et al. |
| 5,282,673 | A * | 2/1994 | Koyama ............. B29C 66/1142 |
| | | | 301/10.1 |
| 5,320,420 | A * | 6/1994 | Gilliam ................... B60B 25/00 |
| | | | 301/105.1 |
| 5,435,629 | A * | 7/1995 | Suzuki .................... B60B 3/002 |
| | | | 301/11.1 |
| 5,918,947 | A | 7/1999 | Stach et al. |
| 6,231,129 | B1 | 5/2001 | Stach |
| 6,726,292 | B1 | 4/2004 | Schroeder et al. |
| 7,040,714 | B2 | 5/2006 | Baier et al. |
| 7,346,984 | B2 | 3/2008 | Baumgartner |
| 7,918,513 | B2 * | 4/2011 | Wilson ...................... B60B 5/02 |
| | | | 301/64.101 |
| 8,840,195 | B1 | 9/2014 | Davis |
| D722,935 | S | 2/2015 | Dingle et al. |
| D726,617 | S | 4/2015 | Dingle et al. |
| D726,618 | S | 4/2015 | Dingle et al. |
| D730,796 | S | 6/2015 | Dingle et al. |
| 2014/0175863 | A1 | 6/2014 | Dingle et al. |
| 2014/0191566 | A1 | 7/2014 | Burlefinger et al. |
| 2015/0008723 | A1 | 1/2015 | Wurft et al. |
| 2015/0076896 | A1 | 3/2015 | Werner et al. |
| 2015/0224818 | A1 | 8/2015 | Hufenbach et al. |

OTHER PUBLICATIONS

Carbon Revolution, Products, http://www.carbonrev.com/cr9/, exact publication date unknown (web page last visited on Mar. 17, 2016).

Carbon Revolution, Technology, http://www.carbonrev.com/technology/, exact publication date unknown (web page last visited on Mar. 17, 2016).

Carbonline Wheels, Carbonline Wheels, http://www.carbonlinewheels.com/index.html, exact publication date unknown (web page last visited on Mar. 17, 2016).

Carbonline Wheels, Products, http://www.carbonlinewheels.com/products.html, exact publication date unknown (web page last visited on Mar. 17, 2016).

Carbonline Wheels, Technology, http://www.carbonlinewheels.com/technology.html, exact publication date unknown (web page last visited on Mar. 17, 2016).

DYMAG, Car Wheels, http://www.dymag.com/car-wheels-2.html, exact publication date unknown (web page last visited on Mar. 17, 2016).

DYMAG, New! Carbon Composite Car Wheel, http://www.dymag.com/new-carbon-composite-car-wheel.html, exact publication date unknown (web page last visited on Mar. 17, 2016).

Ese Carbon Company, About E1, https://esecarbon.com/E1-features, exact publication date unknown (web page last visited on Mar. 17, 2016).

Koenigsegg, Koenigsegg Reinvents the Wheel, http://koenigsegg.com/koenigsegg-reinvents-wheel/, Mar. 2, 2012.

Kringlan, Wheels, http://www.kringlan.ch/wheels/, exact publication date unknown (web page last visited on Mar. 17, 2016).

McGlaun, Shane, BMW Developing Carbon Fiber Wheels to Replace Alloys on Performance Cars, DailyTech, http://www.dailytech.com/BMW+Developing+Carbon+Fiber+Wheels+to+Replace+Alloys+on+Performance+Cars/article34387.htm, Feb. 24, 2014.

Strasse Wheels, About Us, http://strasseforged.com/about-us/, exact publication date unknown (web page last visited on Mar. 17, 2016).

Strasse Wheels, Carbon Fiber Edition, http://strasseforged.com/carbon-fiber-series/, exact publication date unknown (web page last visited on Mar. 17, 2016).

Thyssenkrupp and Maxion Wheels, ThyssenKrupp & Maxion Wheels Announce Cooperation to Develop Cutting-Edge Aluminum/Carbon Fiber Hybrid Wheels [Press Release], http://www.maxionwheels.com/News/381/ThyssenKrupp-and-Maxion-Wheels-Announce-Cooperation-to-Devel.aspx/, Jun. 19, 2015.

Vintage Wheel Works, Wheel diagram and part identification, http://www.vintagewheelworks.com/tech-diag-term.php, exact publication date unknown (web page last visited on Mar. 17, 2016).

Weiss, Vitesse AuDessus releases ultralight carbon fiber sports car wheels, Gizmag, http://www.gizmag.com/vitesse-audessus-carbon-fiber-wheels/38734/, Aug. 1, 2015.

United States Patent and Trademark Office, International Search Report and Written Opinion dated Jun. 6, 2017 for PCT/US2017/022243.

* cited by examiner

WHEELS HAVING MULTIPLE-PIECE COMPOSITE STRUCTURES

BACKGROUND

In automotive and other industries, wheels that are both strong and lightweight are desirable. Strong wheels tend to resist damage, and lightweight wheels generally exhibit improved efficiency and performance due to decreased rotational inertia.

But existing wheels suffer from several drawbacks. For example, strong wheels tend to be heavier, while lightweight wheels tend to be weaker or less durable. Many existing wheels are formed from metal alloys which have limited strength and weight characteristics relative to their cost and material properties. Clever machining techniques may provide strong and lightweight metal wheel designs, but weight savings are minimal compared to the large costs of machining such designs.

Some existing wheels have been made using carbon fiber, but existing carbon fiber wheels are expensive, complicated to manufacture, and they may not provide optimal weight or cost savings. In addition, existing carbon fiber wheel hubs can be damaged by heat produced during braking.

SUMMARY

A wheel includes a first hoop attached to a second hoop about a circumferential interface. The first and second hoops form at least part of an enclosed box structure positioned circumferentially around the wheel and adjacent to an outboard side of the wheel. The box structure may be formed at least in part by circumferential projections of the first hoop and the second hoop. The wheel may also include a central hub that optionally includes spokes. In some embodiments, the central hub may form part of the enclosed box structure. In some embodiments, the first hoop, the second hoop, and optionally, the central hub, may be formed as a single or unitary structure. Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is directed to wheels having multiple-piece composite structures including circumferential box structures for improved strength and weight characteristics. Various embodiments of the technology will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments. Accordingly, the technology may have other embodiments with additional elements or without several of the elements described below with reference to FIGS. 1-14.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of several embodiments of the present technology are described herein with reference to automotive wheels formed with carbon fiber composite materials. In other embodiments, the technology may be used in other industries or using other materials, for example, other composite materials or alloys.

The present technology provides wheels having multiple-piece composite structures, including circumferential box structures for improved strength and weight characteristics. Examples of this technology are illustrated in FIGS. 1-14.

Figure 1:
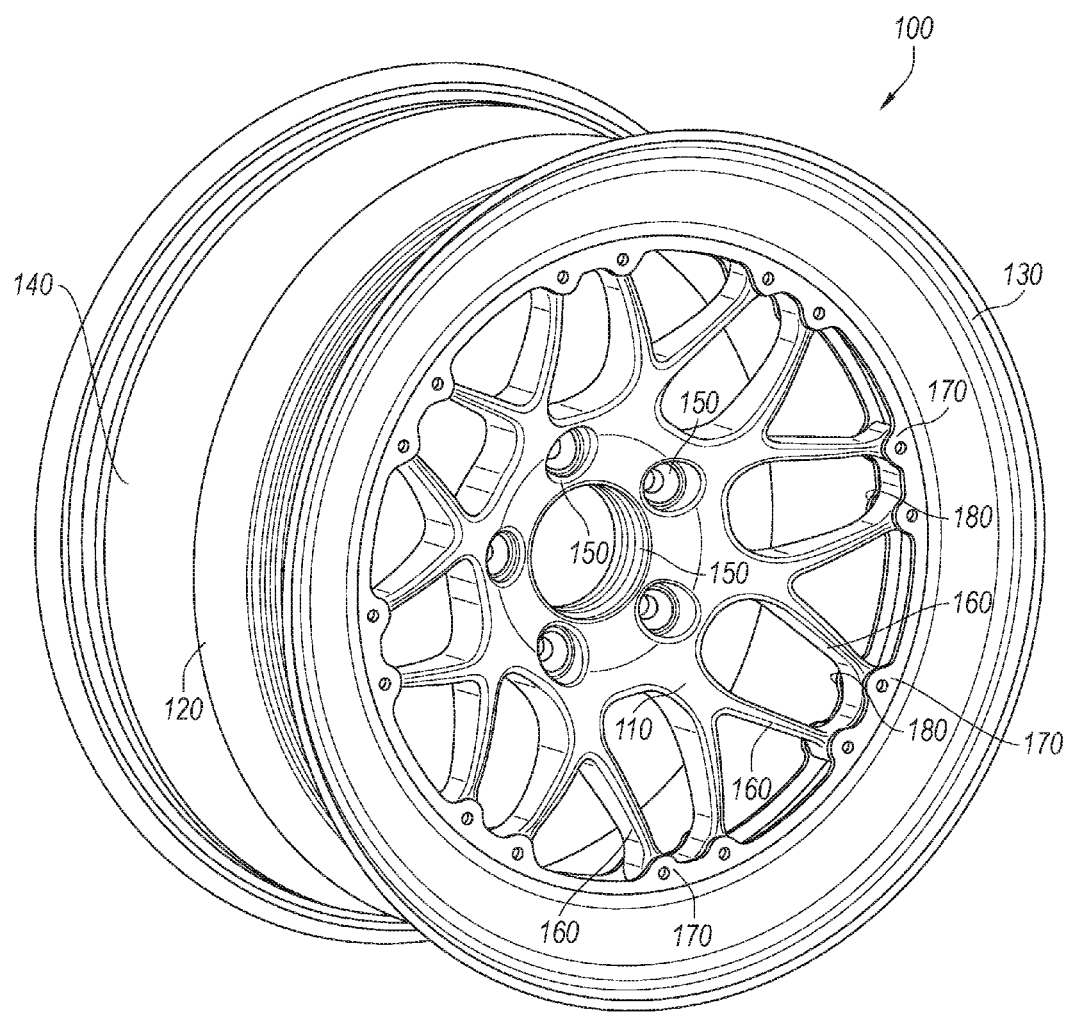
FIG. 1 illustrates a perspective view of a wheel assembly in accordance with several embodiments of the present technology.

FIG. 1 illustrates a perspective view of a wheel assembly 100 in accordance with several embodiments of the present technology. A center or hub portion 110 is mounted in a rim barrel assembly 120. The rim barrel assembly 120 includes an outboard or outer hoop 130 attached to an inboard or inner hoop 140. In use, the outer hoop 130 may face away from a vehicle or towards a curb-side of a vehicle, while the inner hoop 140 may face towards a vehicle or away from a curb-side of a vehicle, although other suitable orientations may be used. The hub portion 110 may include one or more attachment points 150 for attaching the wheel assembly 100 to a vehicle or other device making use of the wheel assembly 100. The attachment points 150 may be similar to wheel attachment points known in the art for attaching a wheel to a vehicle or other device. For example, in some embodiments, the attachment points 150 may be arranged as a bolt circle having a number of openings for wheel lugs (for example, a four-lug attachment or a five-lug attachment). In other embodiments, there may be a center-lock style of attachment to a vehicle axle.

The hub portion 110 may be attached to the rim barrel assembly 120 by mounting a number of spoke portions 160 of the hub portion 110 between outboard or outer flanges 170 of the outer hoop 130 and inboard or inner flanges 180 of the inner hoop 140, as described in further detail below with regard to FIGS. 2-6.

Figure 2:
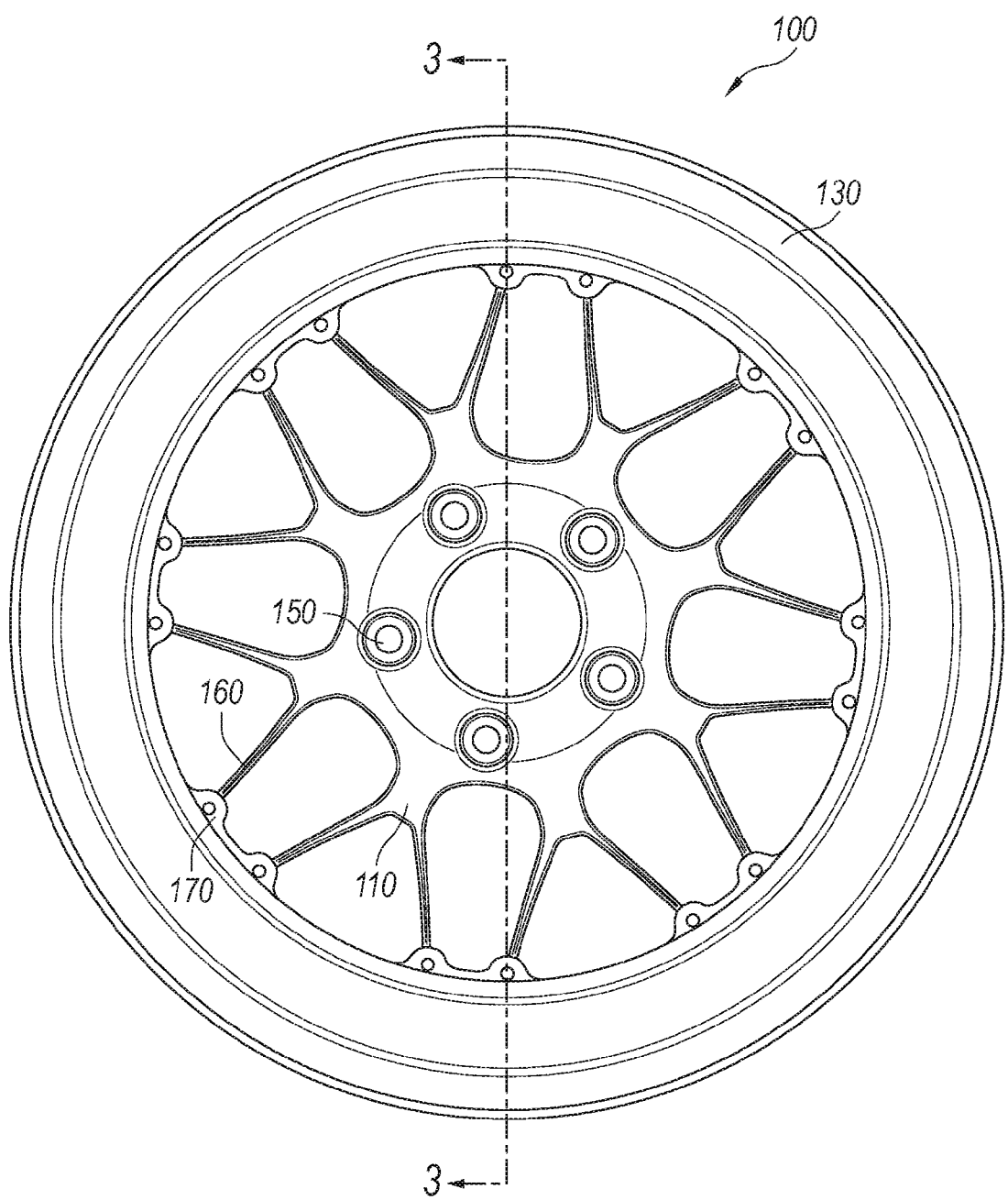
FIG. 2 illustrates a curb-side view of the wheel assembly shown in FIG. 1.
Figure 3:
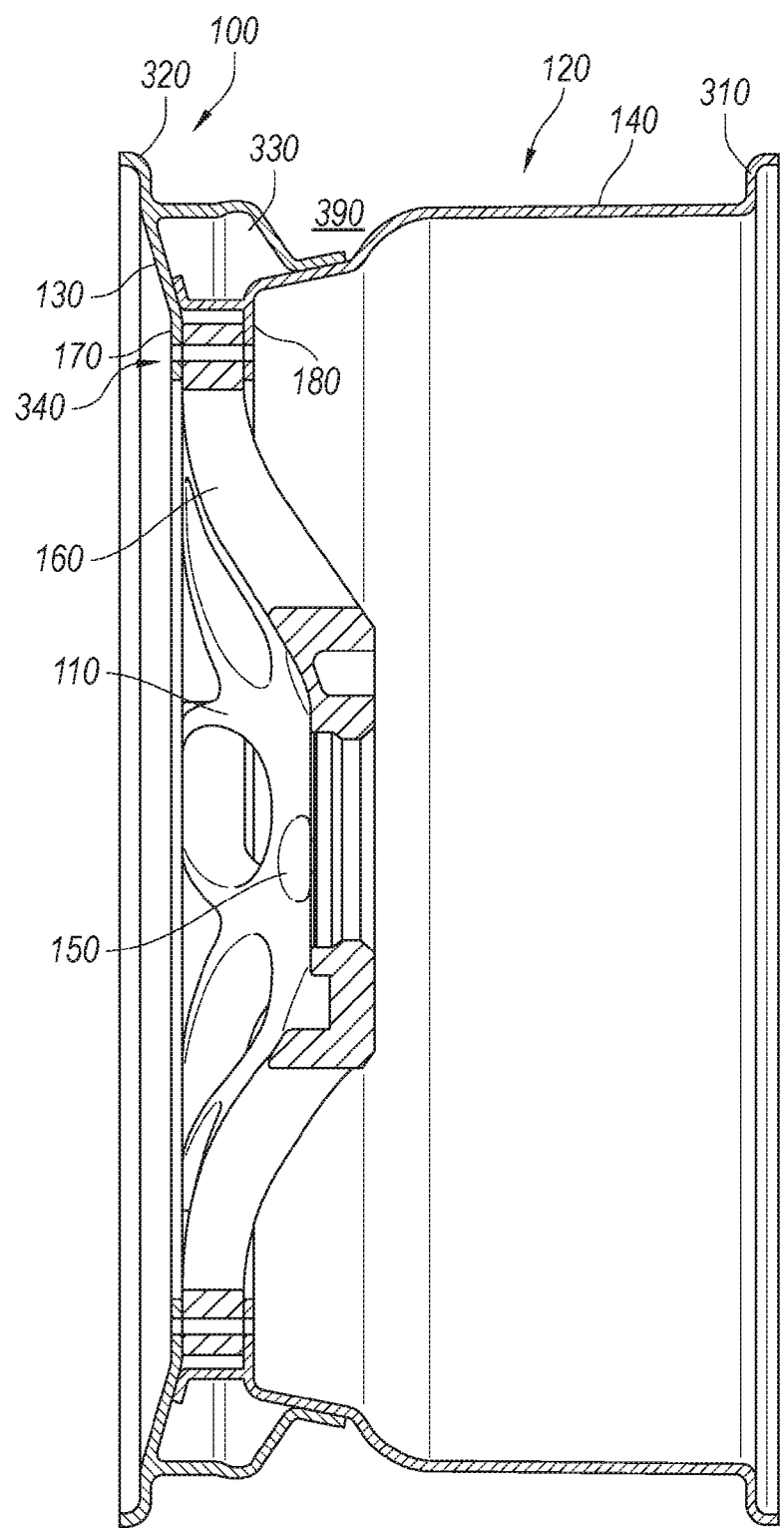
FIG. 3 illustrates a sectional view of the wheel assembly taken along Line 3-3 in FIG. 2.

FIG. 2 illustrates a curb-side view of the wheel assembly 100. Line 3-3 defines a sectional plane for illustrating a sectional view of the wheel assembly 100 in FIG. 3. Turning now to FIG. 3, an inner side of the inner hoop 140 may have a circumferential inner bead flange 310 for retaining the bead portion of a tire to the wheel assembly 100 in a conventional manner. Similarly, an outboard side of the outer hoop 130 may have a circumferential outer bead flange 320 for retaining the bead portion of a tire to the wheel assembly 100 in a conventional manner.

In several embodiments of the present technology, the outer hoop 130 and the inner hoop 140 are shaped to form a circumferential box structure 330 when they are attached to each other. The outer hoop 130 and the inner hoop 140 may also be shaped to form a number of double-shear connection points 340 to receive spoke portions 160. The double-shear connection points 340 may include the outer flange 170 of the outer hoop 130 and the inner flange 180 of the inner hoop 140. The outer and inner flanges 170, 180 may project toward a central or rotational axis of the wheel assembly 100. The double-shear connection points 340 and the box structure 330 are described in additional detail below with respect to FIG. 4. To facilitate mounting a tire to the wheel assembly 100, the outer hoop 130 and the inner hoop 140 may be suitably shaped such that the rim barrel assembly 120 has a drop region 390.

Figure 4:
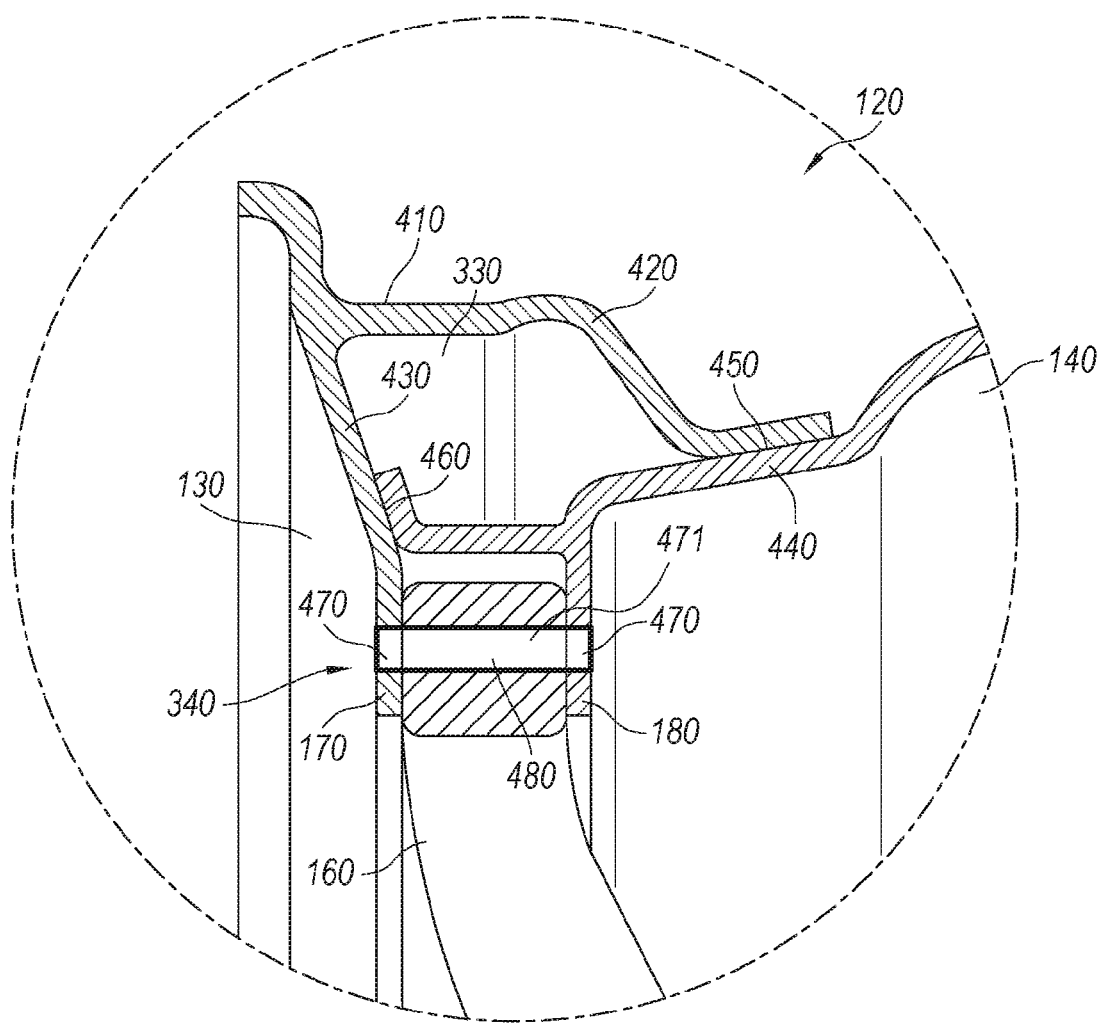
FIG. 4 illustrates a detailed sectional view of the interface between the outer hoop and the inner hoop shown in FIG. 3.

FIG. 4 illustrates a detailed sectional view of the interface between the outer hoop 130 and the inner hoop 140 forming the box structure 330 and a double-shear connection point 340 in accordance with an embodiment of the technology. The box structure 330 is formed from overlapping concentric circumferential projections extending from the outer hoop 130 and the inner hoop 140. For example, the outer hoop 130 may have a circumferential first projection 410 extending generally horizontally or inwardly from an outboard or curb-side face of the outer hoop 130. The first projection 410 may have a circumferential bend 420 toward a center region of the rim barrel assembly 120. The first projection 410, including the bend 420, forms a radially outward portion of the box structure 330. A surface of the first projection 410 forms part of the radially outward surface of the rim barrel assembly 120.

The outer hoop 130 may have a second projection 430 extending generally radially inwardly toward a center region of the rim barrel assembly 120. The second projection 430 forms an outboard or curb-side portion of the box structure 330. The inner hoop 140 may have a circumferential third projection 440 extending outwardly toward the curb-side of the rim barrel assembly 120. The third projection 440 forms a radially inward portion of the box structure 330. When the outer hoop 130 and the inner hoop 140 are brought together to form the rim barrel assembly 120, the first projection 410 may be circumferentially attached to the third projection 440 at a circumferential joint 450, which may be formed by bonding or otherwise attaching parallel portions of the first projection 410 and the third projection 440 together. In some embodiments, the joint 450 may be formed with an adhesive or other suitable applied bonding material, while in other embodiments, the joint 450 may be formed with a fastener, such as a bolt, screw, or rivet, or with another suitable connector. The second projection 430 is bonded or otherwise attached to a portion of the third projection 440 at a circumferential joint 460, which may be formed with an adhesive or other suitable applied bonding material, or with a fastener such as a bolt, screw, or rivet, or with another suitable connector.

When the outer hoop 130 is bonded or otherwise attached to the inner hoop 140 at the circumferential joints 450, 460, the box structure 330 is formed by the projections 410, 430, 440. In other embodiments, other shapes or arrangements of projections 410, 430, 440 may be used to form the box structure 330. For example, in some embodiments, the box structure 330 may have a relatively square cross-section. In other embodiments, the box structure 330 may have a triangular cross-section or a cross-section having other shapes with any number of faces. In yet other embodiments, the box structure 330 may have a more rounded cross-section (for example, circular, elliptical, etc.) or an irregularly-shaped cross-section. In some embodiments, the joints 450, 460 do not need to be formed from parallel portions of the projections 410, 430, 440.

In some embodiments, as described above, the double-shear connection points 340 for attaching the spokes 160 to the rim barrel assembly 120 may be formed by the outer flange 170 and the inner flange 180. The outer flange 170 may be a part of the second projection 430. The inner flange 180 may be a part of the third projection 440. The outer and inner flanges 170, 180 extend generally radially inwardly in the rim barrel assembly 120 in a generally parallel orientation, spaced apart to receive a spoke 160. The outer flange 170 and the inner flange 180 may each have a through-hole 470 that is coaxial with a bore 480 in the spoke 160. A bolt, pin, or other suitable fastener 471 may pass through the through-holes 470 and the bore 480 to mount the hub portion 110 to the rim barrel assembly 120.

In some embodiments, such a bolt, pin, or other fastener may be positioned so that it is not visible from a curb-side view of the wheel assembly 100. For example, such a bolt, pin, or other fastener may be recessed behind a curb-side surface of each outer flange 170 such that the outer flange 170 does not have a through-hole 470, but rather an indentation or recess on its inboard side to receive an end of the bolt, pin, or other fastener. In some embodiments, an adhesive or other suitable connector may optionally retain the spoke 160 in the double-shear connection point 340, with or without a bolt, pin, or other fastener between the hub portion 110 and rim barrel assembly 120. Although a double-shear connection point 340 is illustrated, in some embodiments, a single-shear connection may be used, such that either the outer flange 170 or the inner flange 180 is omitted and a spoke 160 is mounted in the wheel assembly 100 by connection with the remaining flange. For example, the inner flange 180 may be omitted and the spoke 160 may be attached to the outer flange 170 as described herein.

Figure 5:
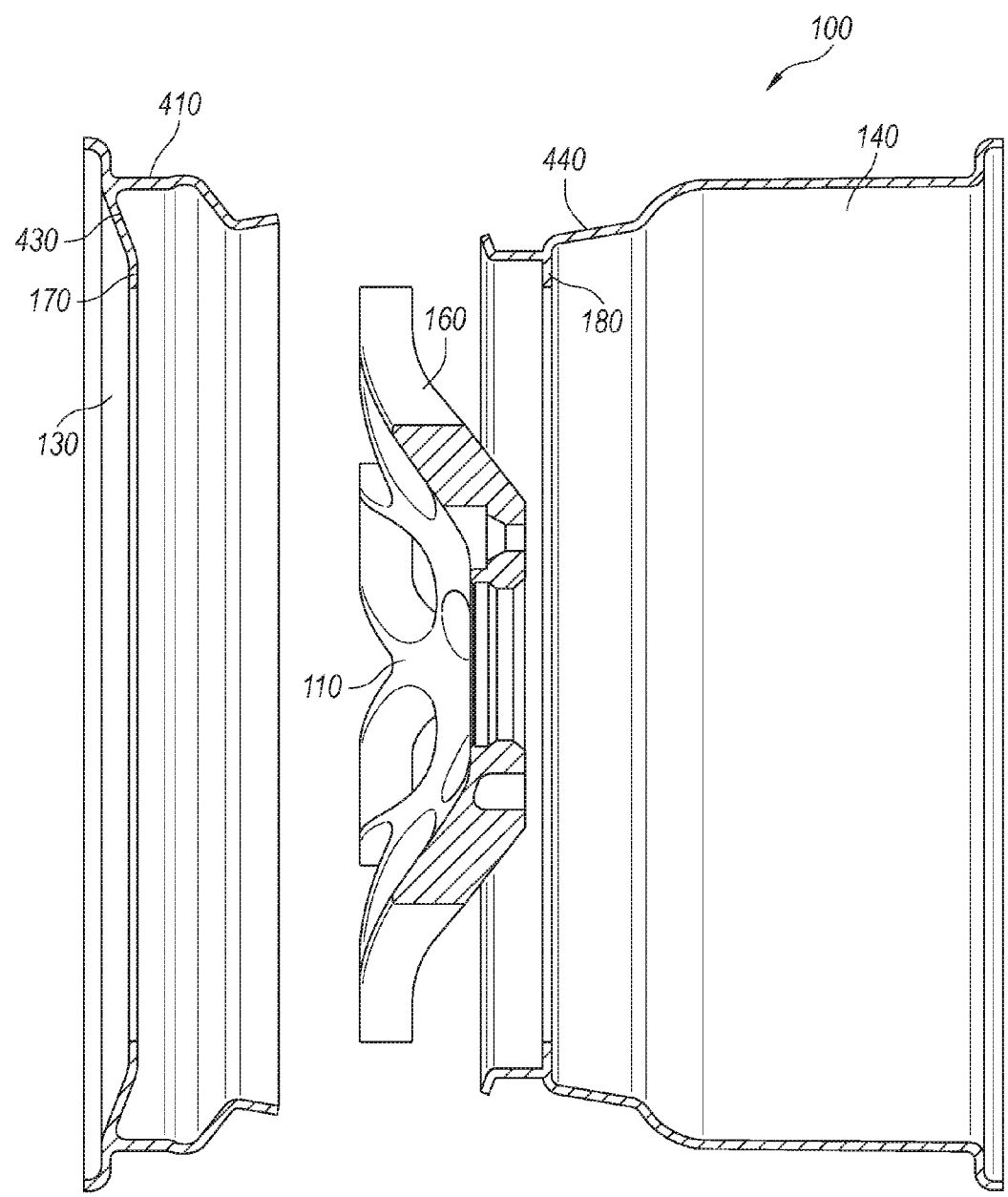
FIG. 5 illustrates an exploded cross-sectional view of the wheel assembly illustrated in FIGS. 1-4.
Figure 6:
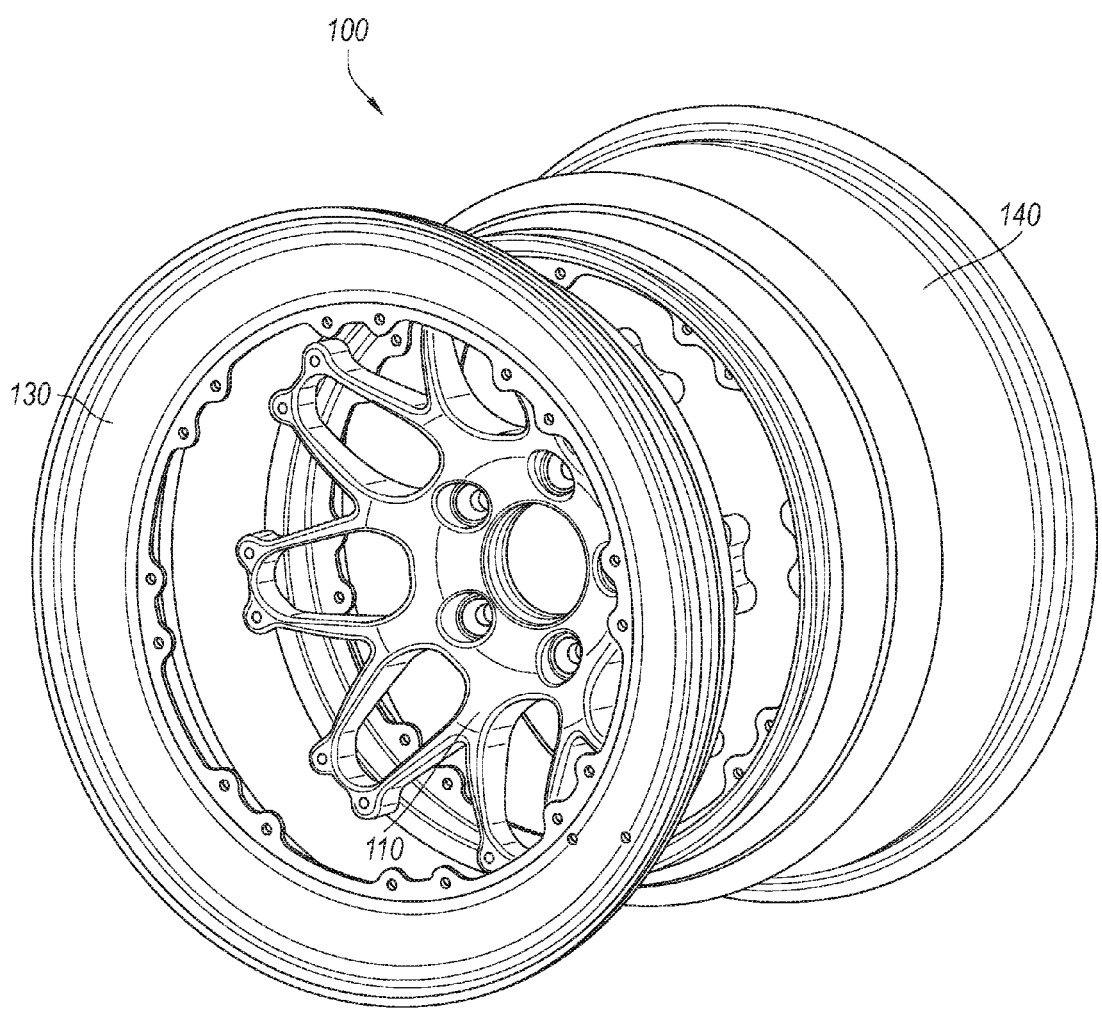
FIG. 6 illustrates an exploded perspective view of the wheel assembly illustrated in FIGS. 1-4.

FIGS. 5 and 6 illustrate an exploded cross-sectional view and an exploded perspective view, respectively, of the wheel assembly 100 illustrated and described above with regard to FIGS. 1-4. The outer hoop 130, the inner hoop 140, and the hub portion 110 may be manufactured separately and attached together to form the wheel assembly 100. In some embodiments, the outer hoop 130 and the inner hoop 140 are formed from a carbon fiber composite material. In other embodiments, other materials or combinations of materials may be used, such as thermoplastics, thermoset polymers, other composite materials, metals, or metal alloys. In some embodiments, the outer hoop 130 and the inner hoop 140 are formed from the same materials, while in other embodiments, the outer hoop 130 and the inner hoop 140 are formed from different materials. The hub portion 110 may be formed with a variety of materials or combinations of materials, including, for example, carbon fiber materials, thermoplastic materials, fiberglass materials, fiber reinforced plastic materials, other composite materials, or metals such as magnesium, aluminum, or other suitable metals or metal alloys. Accordingly, in a particular embodiment, the outer hoop 130 and the inner hoop 140 are formed from a carbon fiber composite material, while the hub portion 110 is formed from an aluminum alloy, such that the wheel assembly 100 is a three-piece hybrid metal-composite wheel (not counting fasteners).

In some embodiments, the hub portion 110 may be formed from a combination of materials, such as a carbon fiber skin material wrapped or otherwise layered upon an aluminum or other metal structural part. Such embodiments may provide for a lightweight and low-cost assembly with a carbon fiber look or style. In yet further embodiments, the hub portion 110 may be formed from a combination of fiberglass and carbon fiber to provide light weight and strong impact-resistance properties. In some embodiments, the hub portion 110 may have one or more embedded bushings (for example, metal bushings) at the attachment points 150 to accommodate the wheel lugs or center-lock hub for connecting to a vehicle axle. Such bushings may provide a protective interface between a vehicle axle and the hub portion 110.

In addition to providing lightweight wheels, there are many advantages to embodiments of the present technology. For example, the box structure 330 provides improved stiffness for the wheel assembly 100. The double-shear connection points 340 provide a secure mount for the hub portion 110 while also reinforcing the bond between the outer hoop 130 and the inner hoop 140. The double-shear connection points 340 also allow improved visibility of the rim barrel assembly 120 for improved aesthetics.

In embodiments using a metallic (for example, aluminum) hub portion 110, the hub portion 110 may act as a heat sink for brake heat, which can help resist heat damage to the composite parts of the wheel assembly 100 that might otherwise occur in a full carbon fiber composite wheel. In embodiments using a composite (for example, carbon fiber) hub portion 110, a thermal liner or insulator can be placed between the hub portion 110 and the brakes of a vehicle. For example, such a thermal liner may include a plastic or ceramic plate, a heat-reflective sheet, or another thermal resistive or reflective material to shield or protect the hub portion 110 from heat produced during braking maneuvers. In some embodiments, the thermal liner may be attached to the hub portion 110. In some embodiments, the thermal liner may be in the form of washers or bushings between the hub portion 110 and the vehicle's brake assembly. Other advantages to the foregoing structure include improved clearance of brake calipers and decreased camber compliance due to a larger inboard dish formed in the rim barrel assembly 120.

Figure 6A:
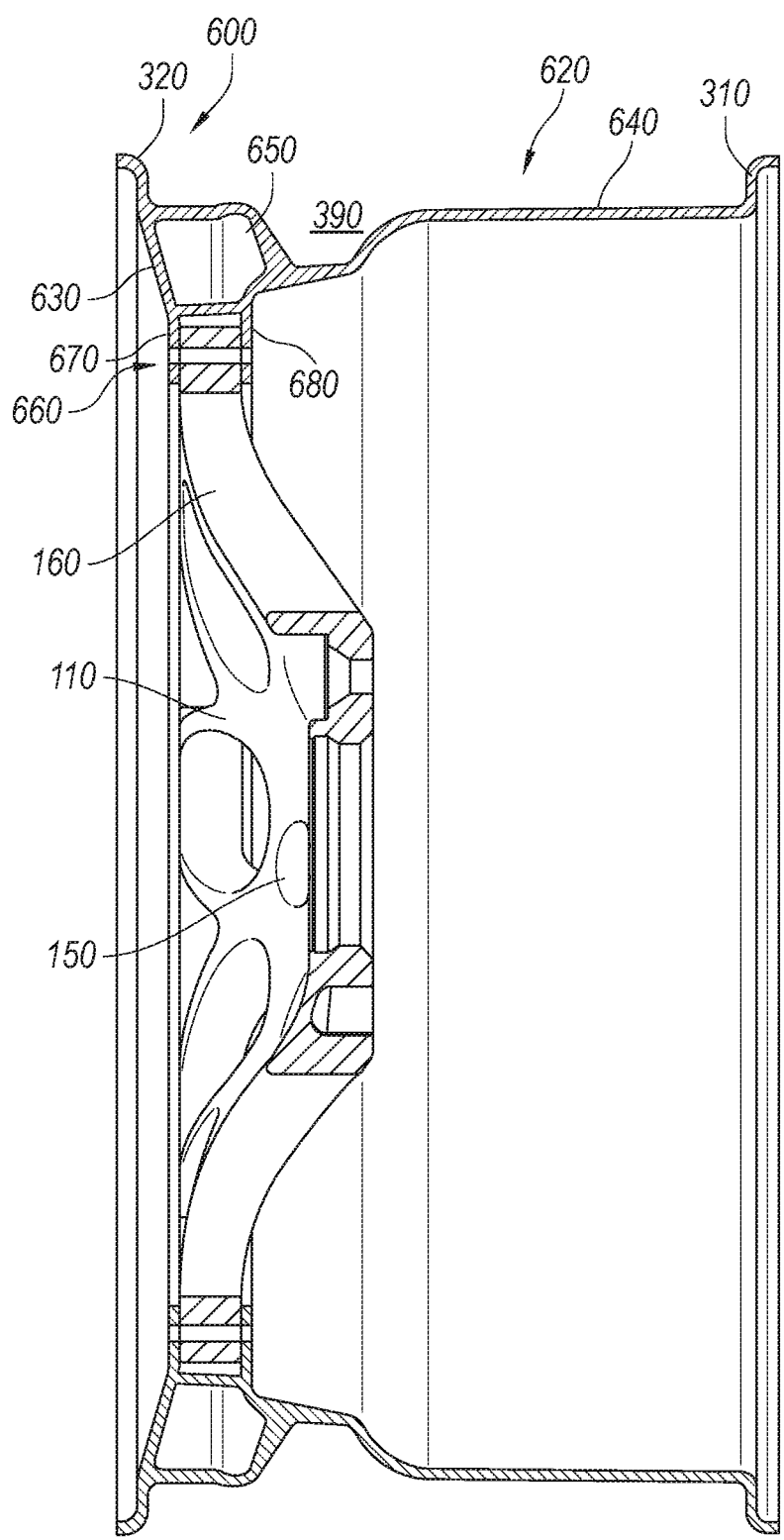
FIG. 6a illustrates a sectional view of a wheel assembly in accordance with another embodiment of the present technology.

FIG. 6a illustrates a sectional view of a wheel assembly 600 in accordance with another embodiment of the present technology. The view in FIG. 6a is similar to the view in FIG. 3, in that it represents a cross section of a wheel taken along a line similar to line 3-3 in FIG. 2. Although a rim barrel assembly may be formed from a plurality of pieces (for example, as described above with regard to the rim barrel assembly 120), a rim barrel 620 may optionally be formed as a single integral piece, having a box structure 650 integrally formed therein and being positioned about a circumference of the rim barrel 620.

For example, an outer hoop portion 630 and an inner hoop portion 640 may be molded, laid-up, or otherwise formed as one single integral piece (i.e., omitting circumferential joints such as the joints 450, 460 described above). In such an embodiment, the box structure 650 may be formed as an open space when the rim barrel 620 is formed. The box structure 650 may be similar in shape to other box structures disclosed herein.

A hub portion 110 may be positioned in the rim barrel 620 during layup or molding, or it may be installed in the rim barrel 620 after the rim barrel 620 is assembled. The hub portion 110 may be attached to the rim barrel 620 using a number of double-shear connection points 660, each having an outer flange 670 and an inner flange 680 (in a manner similar to the double-shear connection points 340 described above). In some embodiments, a single-shear connection point may be used, such that either the outer flange 670 or the inner flange 680 is omitted, and a spoke 160 is mounted in the wheel assembly 100 by connection with a single flange.

Figure 7:
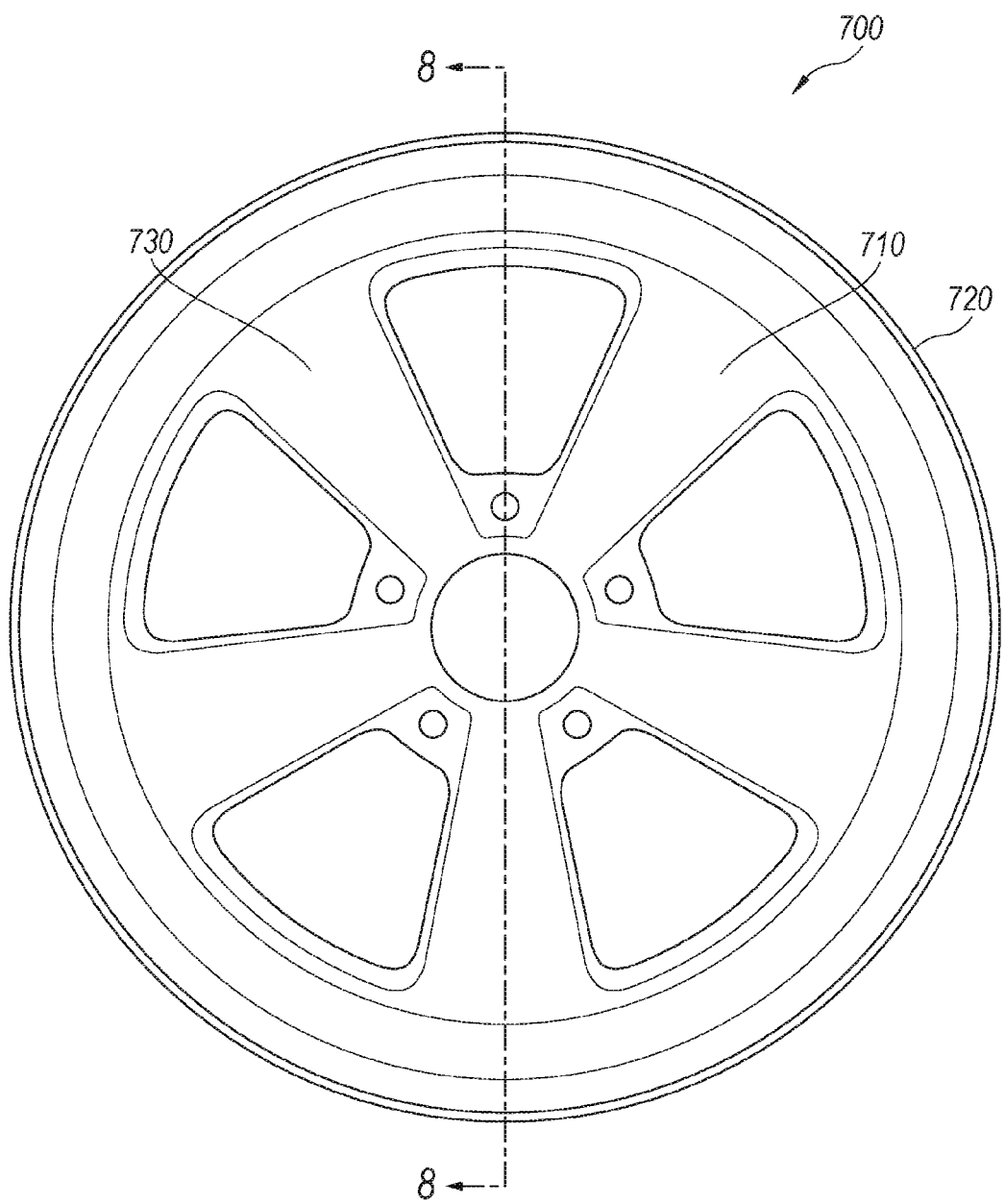
FIG. 7 illustrates a curb-side view of a wheel assembly in accordance with another embodiment of the present technology.

FIG. 7 illustrates a curb-side view of a wheel assembly 700 in accordance with another embodiment of the present technology. A hub portion 710 is bonded or otherwise attached to an outer hoop 720, which is bonded or otherwise attached to an inner hoop 810 described below with regard to FIG. 8. The hub portion 710 may include spokes 730. Line 8-8 defines a sectional plane for illustrating a sectional view of the wheel assembly 700 in FIG. 8.

Figure 8:
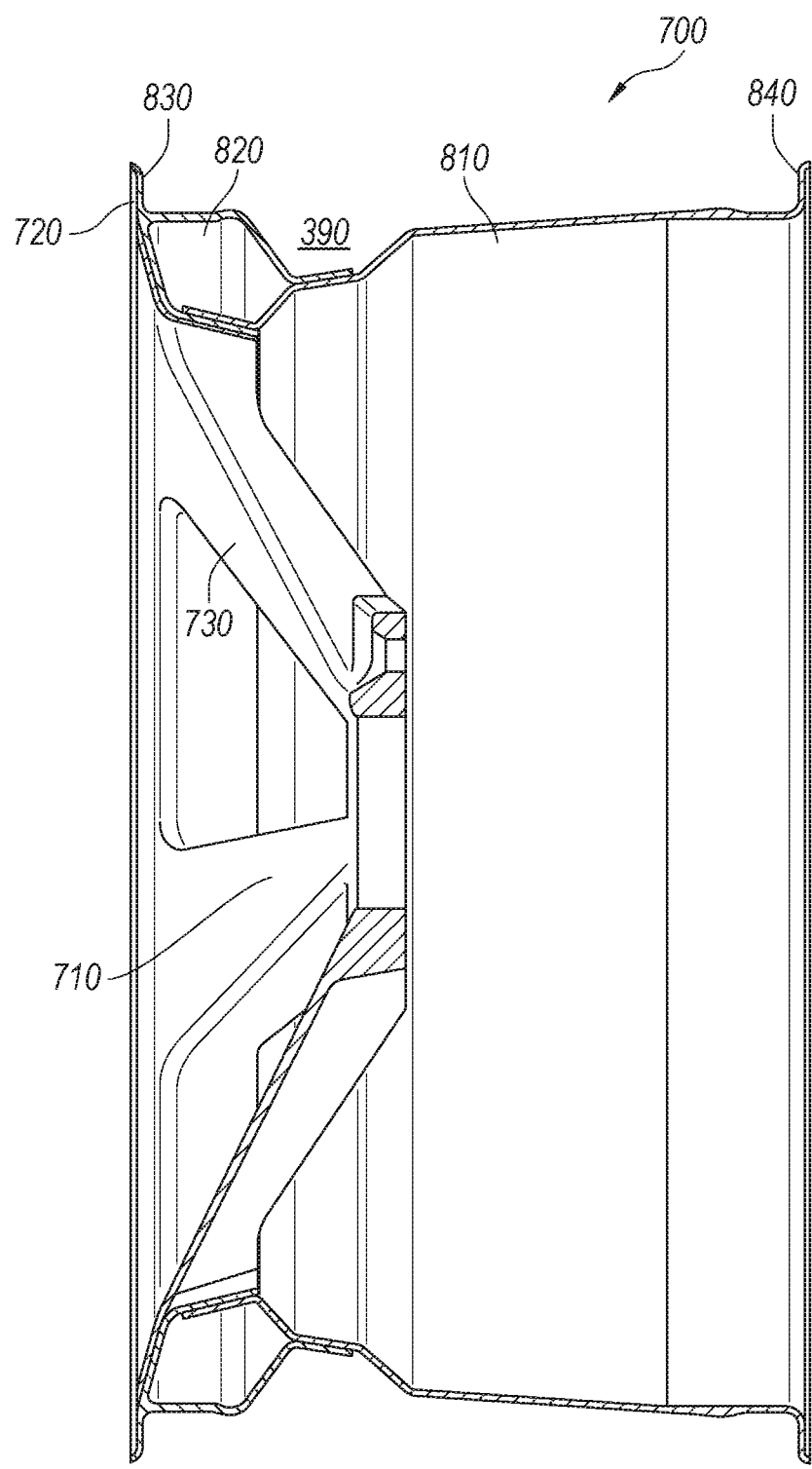
FIG. 8 illustrates a sectional view of the wheel assembly taken along Line 8-8 in FIG. 7.

FIG. 8 illustrates a sectional view of the wheel assembly 700 shown in FIG. 7, taken across the plane defined by 8-8 shown in FIG. 7. The outer hoop 720 and an inner hoop 810 are shaped such that when they are joined together in the wheel assembly 700, they form a circumferential box structure 820, as further described below with regard to FIG. 9. Circumferential bead flanges 830, 840 retain a tire on the wheel assembly 700.

Figure 9:
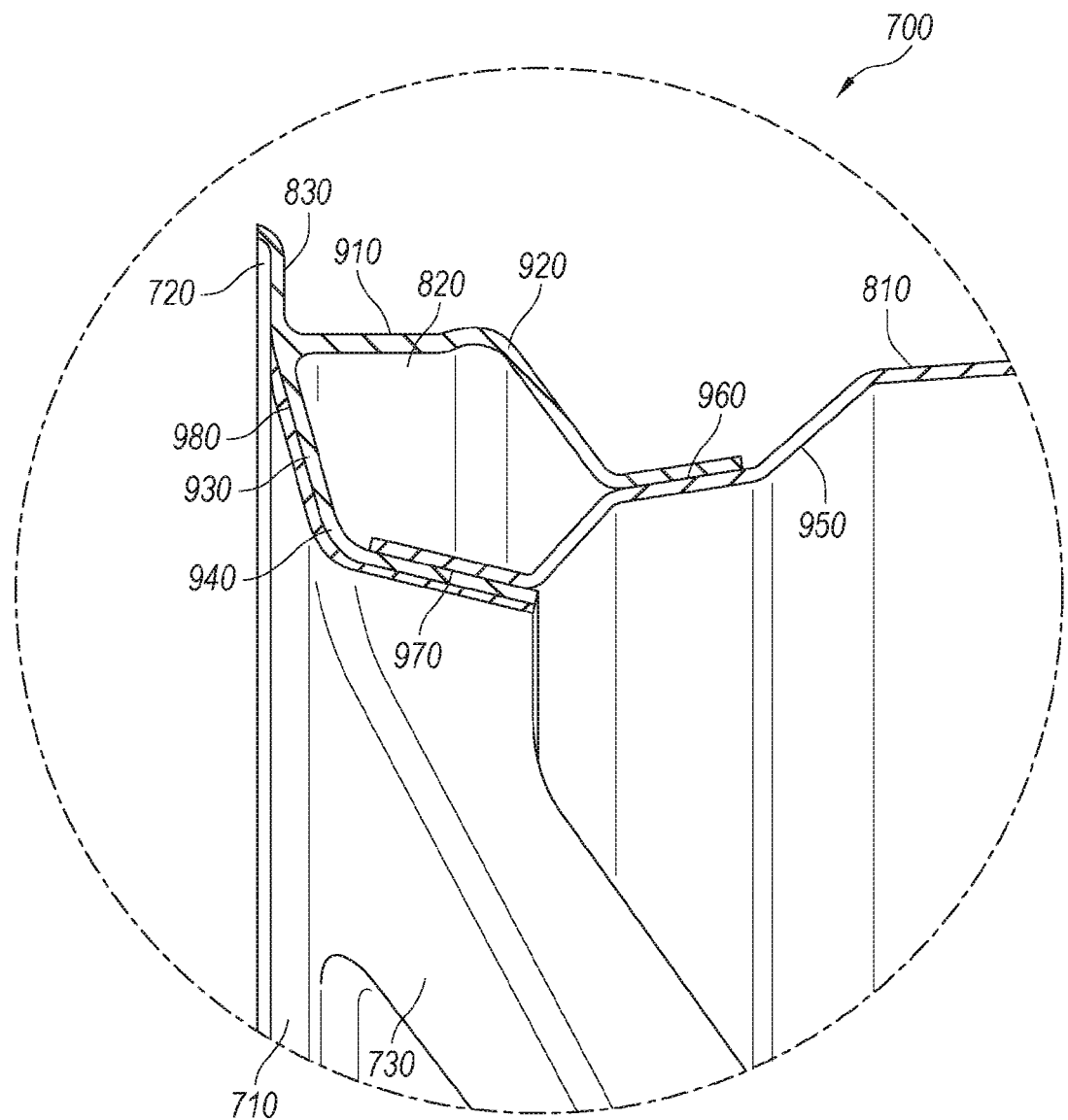
FIG. 9 illustrates a detailed sectional view of the box structure shown in FIG. 8.

FIG. 9 illustrates a detailed sectional view of the box structure 820 formed between the outer hoop 720 and the inner hoop 810. FIG. 9 also illustrates the attachment between the hub portion 710 and the outer hoop 720. The box structure 820 is formed from overlapping concentric circumferential projections extending from the outer hoop 720 and the inner hoop 810. For example, the outer hoop 720 may have a circumferential first projection 910 that may be generally similar to the first projection 410 of the outer hoop 130 illustrated in FIGS. 1-6. Specifically, the first projection 910 of the outer hoop 720 may extend generally horizontally or inwardly from an outer or curb-side face of the outer hoop 720. The first projection 910 may have a circumferential bend 920 toward a center region of the wheel assembly 700. The first projection 910, including the bend 920, forms a radially outward portion of the box structure 820. A surface of the first projection 910 forms a part of a radially outward surface of the wheel assembly 700.

The outer hoop 720 may further include a circumferential second projection 930 extending generally radially inwardly toward a center region of the wheel assembly 700. The second projection 930 may have a circumferential bend 940 toward the inner hoop 810. The second projection 930 therefore forms portions of a curb-side and radially inward region of the box structure 820. The inner hoop 810 may have a circumferential third projection 950 extending outwardly toward the curb-side of the wheel assembly 700. The third projection 950 forms part of a radially inward portion of the box structure 820. When the outer hoop 720 and the inner hoop 810 are brought together to form the wheel assembly 700, the first projection 910 may be circumferentially attached to the third projection 950 at a joint 960, which may be formed similarly to joints described above with regard to FIGS. 1-6. Likewise, the second projection 930 may be circumferentially attached to the third projection 950 at a joint 970. The hub portion 710 may be attached to the outer hoop 720 along a circumferential joint 980, using adhesive or other suitable bonding material. In some embodiments, a number of fasteners may be used to join the hub portion 710 to the outer hoop 720.

Figure 10:
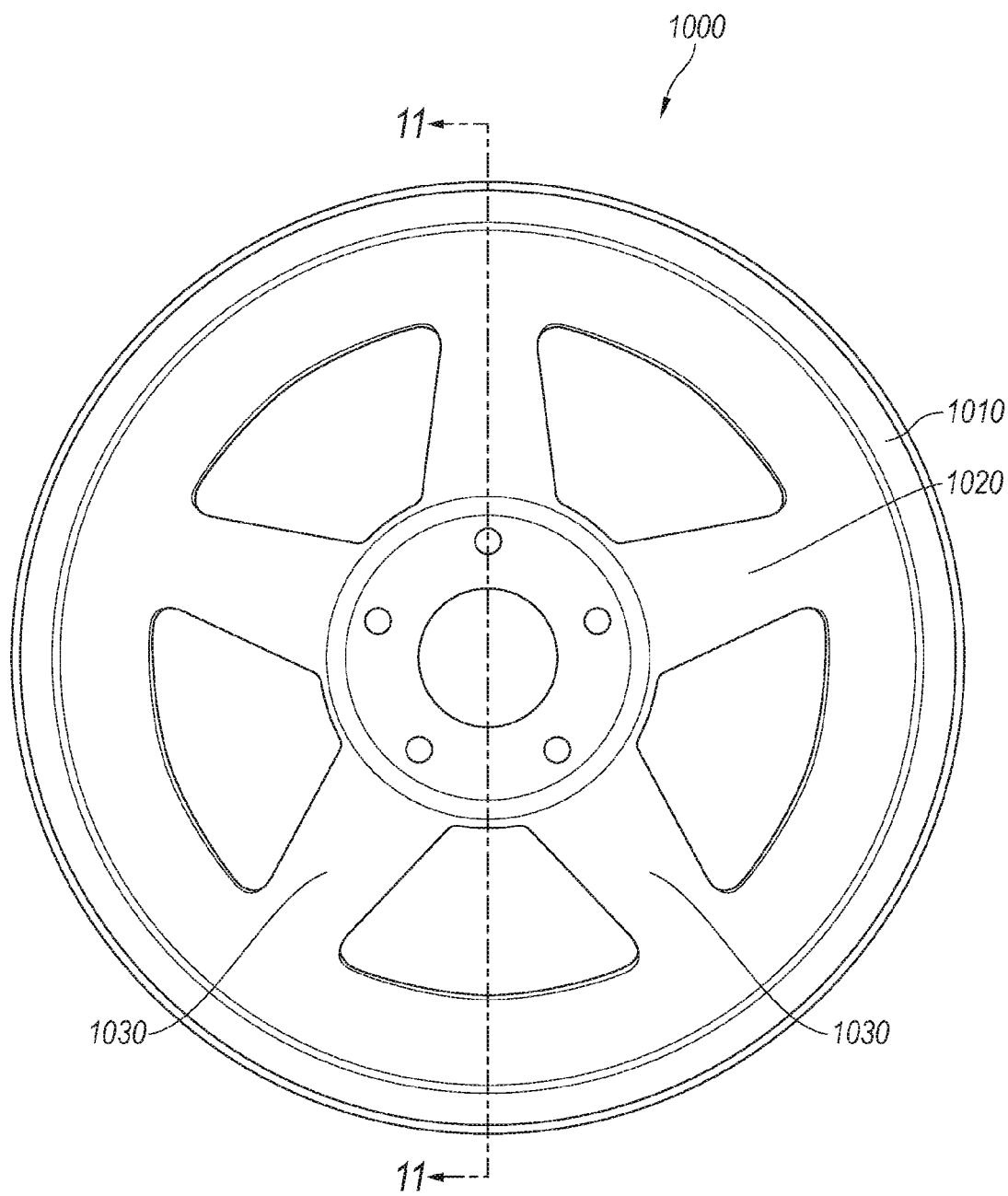
FIG. 10 illustrates a curb-side view of a wheel assembly in accordance with another embodiment of the present technology.

FIG. 10 illustrates a curb-side view of a wheel assembly 1000 in accordance with another embodiment of the present technology. A hub portion 1010 is attached to an outer hoop 1020 an inner hoop described below with regard to FIG. 11. The hub portion 1010 may be at least partially hollow, for example, by utilizing hollow spokes 1030, making it lighter and more stiff. Line 11-11 defines a sectional plane for illustrating a sectional view of the wheel assembly 1000 in FIG. 11.

Figure 11:
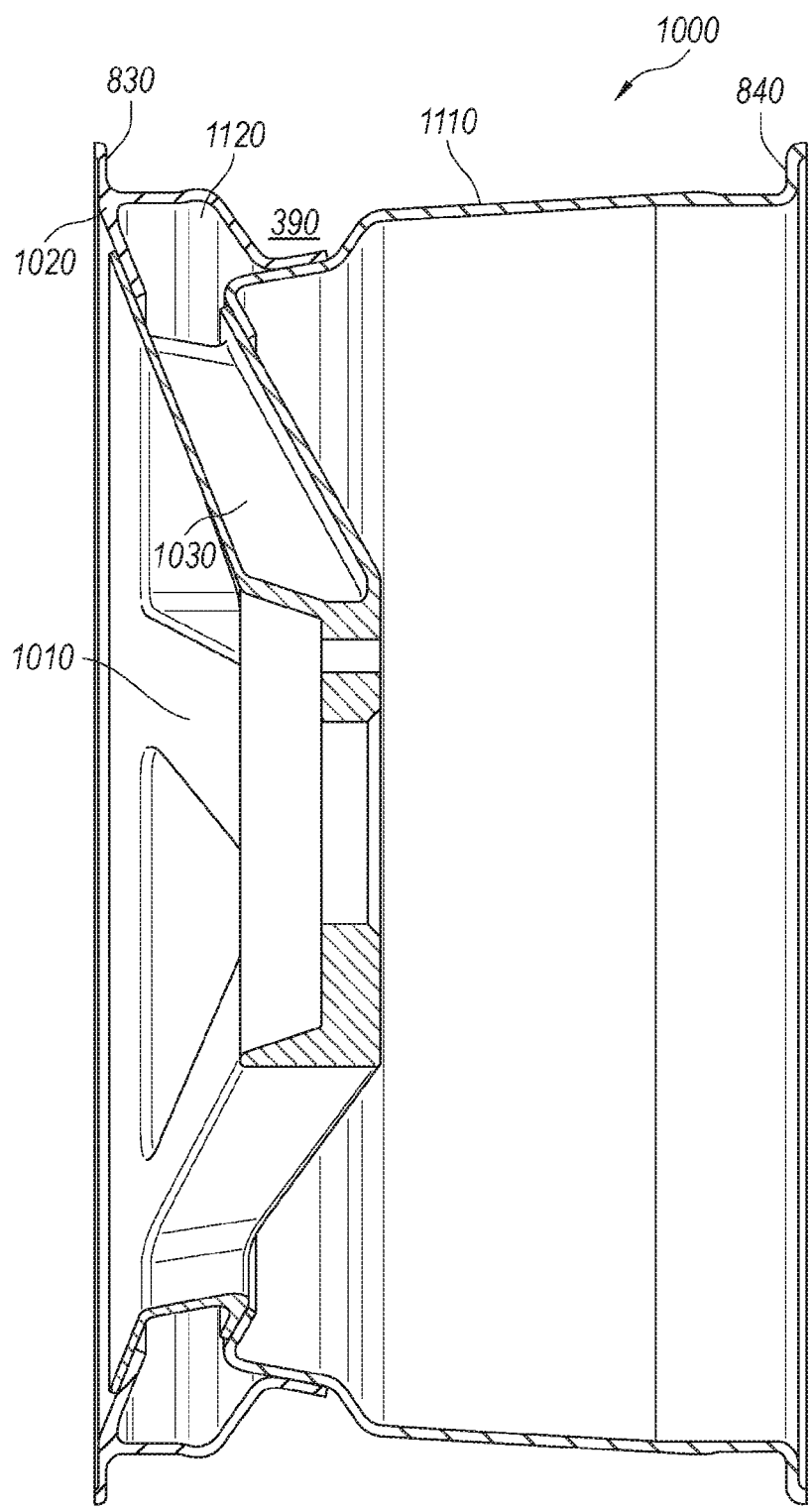
FIG. 11 illustrates a sectional view of the wheel assembly taken along Line 11-11 in FIG. 10.

FIG. 11 illustrates a sectional view of the wheel assembly 1000 shown in FIG. 10, taken across the plane defined by 11-11 shown in FIG. 10. The outer hoop 1020, the hollow spokes 1030, and an inner hoop 1110 are shaped such that when they are joined together in the wheel assembly 1000, they form a circumferential box structure 1120 as further described below with regard to FIG. 12. Circumferential bead flanges 830, 840 retain a tire on the wheel assembly 1000.

Figure 12:
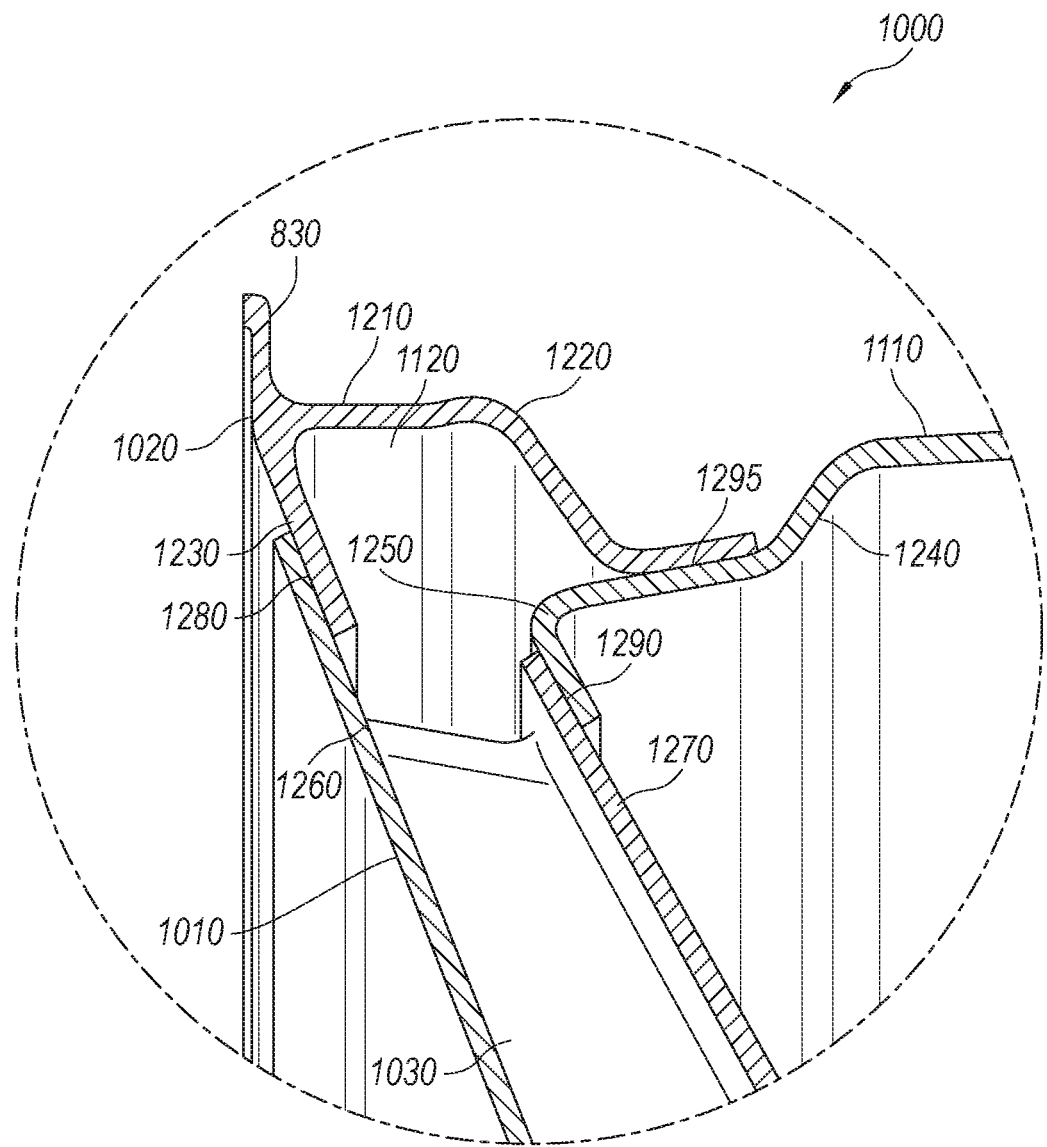
FIG. 12 illustrates a detailed sectional view of the box structure shown in FIG. 11.

FIG. 12 illustrates a detailed sectional view of the box structure 1120 formed by the hollow space provided in the interface between the outer hoop 1020, the hollow spokes 1030, and the inner hoop 1110. FIG. 12 also illustrates the attachment between the hub portion 1010 and the outer hoop 1020 (via the hollow spokes 1030). The box structure 1120 is formed from overlapping concentric circumferential projections extending from the outer hoop 1020 and the inner hoop 1110, along with portions of the hollow spokes 1030. For example, the outer hoop 1020 may have a circumferential first projection 1210 that may be generally similar to the first projection 910 of the outer hoop 720 illustrated in FIGS. 8-9. Specifically, the first projection 1210 of the outer hoop 1020 may extend generally horizontally or inwardly from an outer or curb-side face of the outer hoop 1020. The first projection 1210 may have a circumferential bend 1220 toward a center region of the wheel assembly 1000. The first projection 1210, including the bend 1220, forms a radially outward portion of the box structure 1120. A surface of the first projection 1210 forms a part of a radially outward surface of the wheel assembly 1000.

The outer hoop 1020 may further include a circumferential second projection 1230 extending generally radially inwardly toward a center region of the wheel assembly 1000. The second projection 1230 forms part of a curb-side region of the box structure 1120. The inner hoop 1110 may have a circumferential third projection 1240 extending outwardly toward the curb-side of the wheel assembly 1000. The third projection 1240 may have a bend 1250 towards a center region of the wheel assembly 1000. The third projection 1240 forms part of a radially inward portion of the box structure 1120. Outward walls 1260 and inward walls 1270 of the hub portion 1010 (for example, the spokes 1030) may be attached to the second projection 1230 and the third projection 1240, respectively, at parallel joints 1280, 1290. The first projection 1210 may be attached to the third projection 1240 at a joint 1295. Accordingly, when the outer hoop 1020, the inner hoop 1110, and the hub portion 1010 (with hollow spokes 1030) are brought together to form the wheel assembly 1000, the respective projections are circumferentially attached. In some embodiments, the attachments may use an adhesive or another suitable bonding material at the joints. In other embodiments, a number of fasteners may additionally or alternatively be used at the joints 1280, 1290, 1295.

In the embodiments generally illustrated in FIGS. 7-12, the hub portions (710, 1010), the inner hoops (810, 1110), and the outer hoops (720, 1020) may be formed from a carbon fiber composite material. In other embodiments, the elements forming the wheel assemblies 700, 1000 may be formed from other materials, including other composite materials or metal alloys, for example. In some embodiments, the hub portion, the inner hoop, and the outer hoop may be formed from the same materials, or in other embodiments, they may be formed from different materials.

Figure 12A:
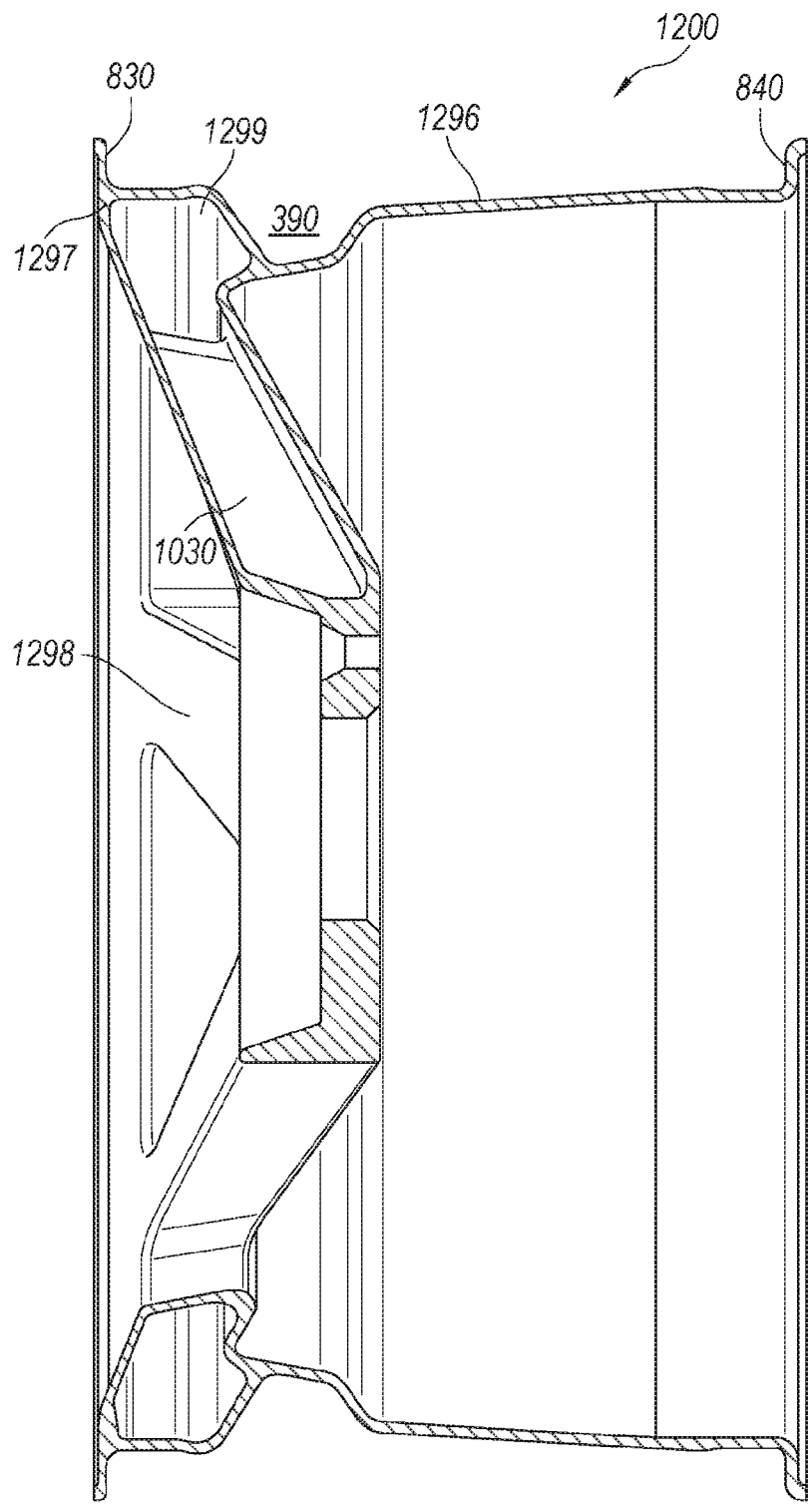
FIG. 12a illustrates a sectional view of a wheel assembly in accordance with another embodiment of the present technology.

In yet further embodiments, as generally illustrated in FIG. 12a, joints between elements (for example, joints 1280, 1290, 1295 described above) may be omitted in favor of a wheel 1200 formed from a single integral element (excluding bushings used for attachment points). For example, an inner hoop portion 1296, an outer hoop portion 1297, and a hub portion 1298 may be molded, laid-up, or otherwise formed as a single integral piece having a box structure 1299 integrally formed therein and positioned about a circumference of the wheel 1200. In such an embodiment, the box structure 1299 may be formed as an open space when the wheel 1200 is formed. The box structure 1299 may be similar in shape to other box structures disclosed herein (for example, box structure 1120), and space within the box structure 1299 may optionally connect to the space within one or more hollow spokes 1030, such as at a location where the spokes 1030 abut or intersect the box structure 1299.

Figure 13:
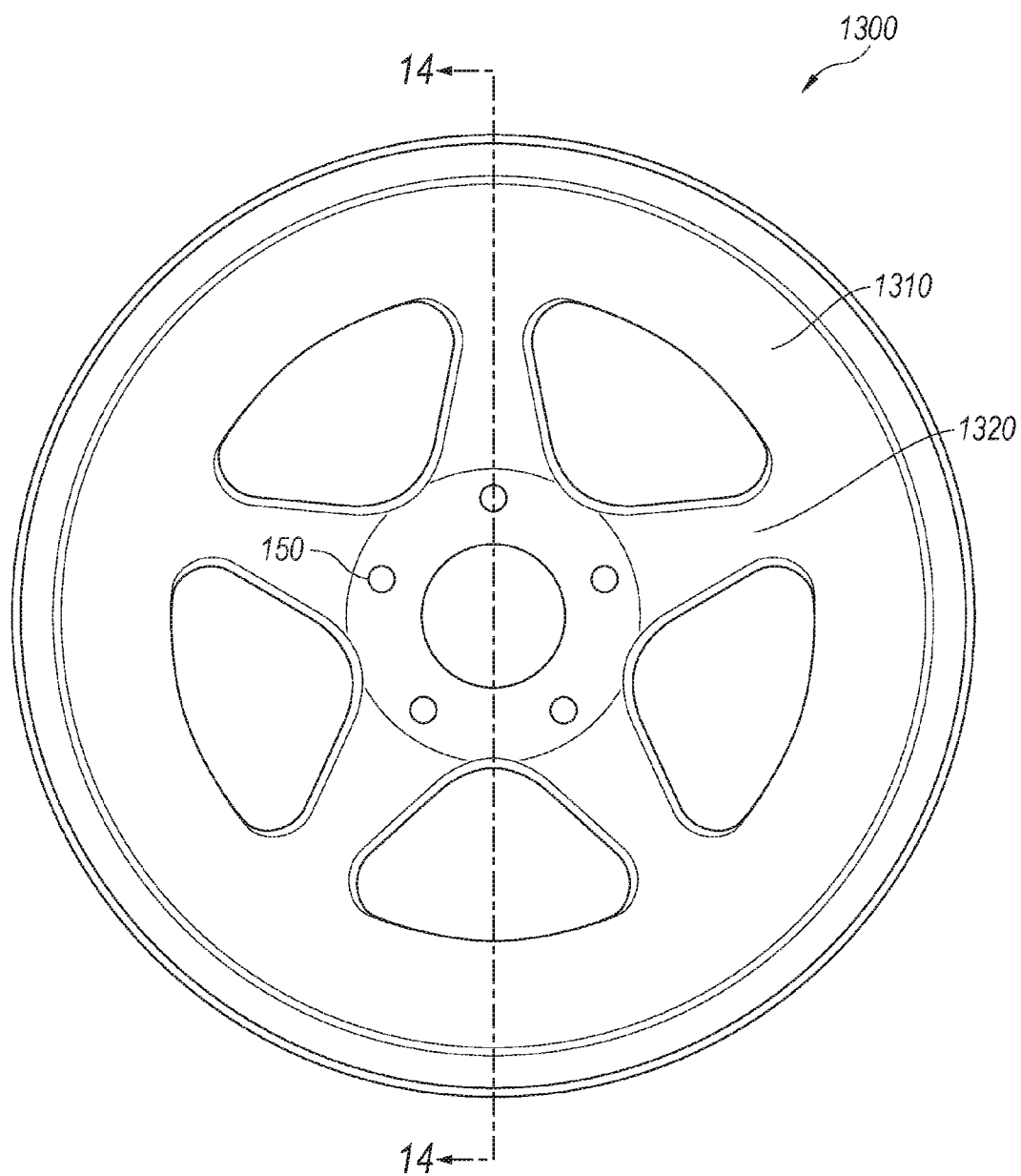
FIG. 13 illustrates a curb-side view of a two-part composite wheel assembly in accordance with another embodiment of the present technology.

FIG. 13 illustrates a curb-side view of a two-part composite wheel assembly 1300 in accordance with another embodiment of the present technology. An outer hoop structure 1310 and spokes 1320 are integral with each other (for example, they may be formed or manufactured as one piece) and form a first part of the wheel assembly 1300. An inner hoop 1410, described below with regard to FIG. 14, forms a second part of the wheel assembly 1300. Line 14-14 defines a sectional plane for illustrating a sectional view of the wheel assembly 1300 in FIG. 14.

Figure 14:
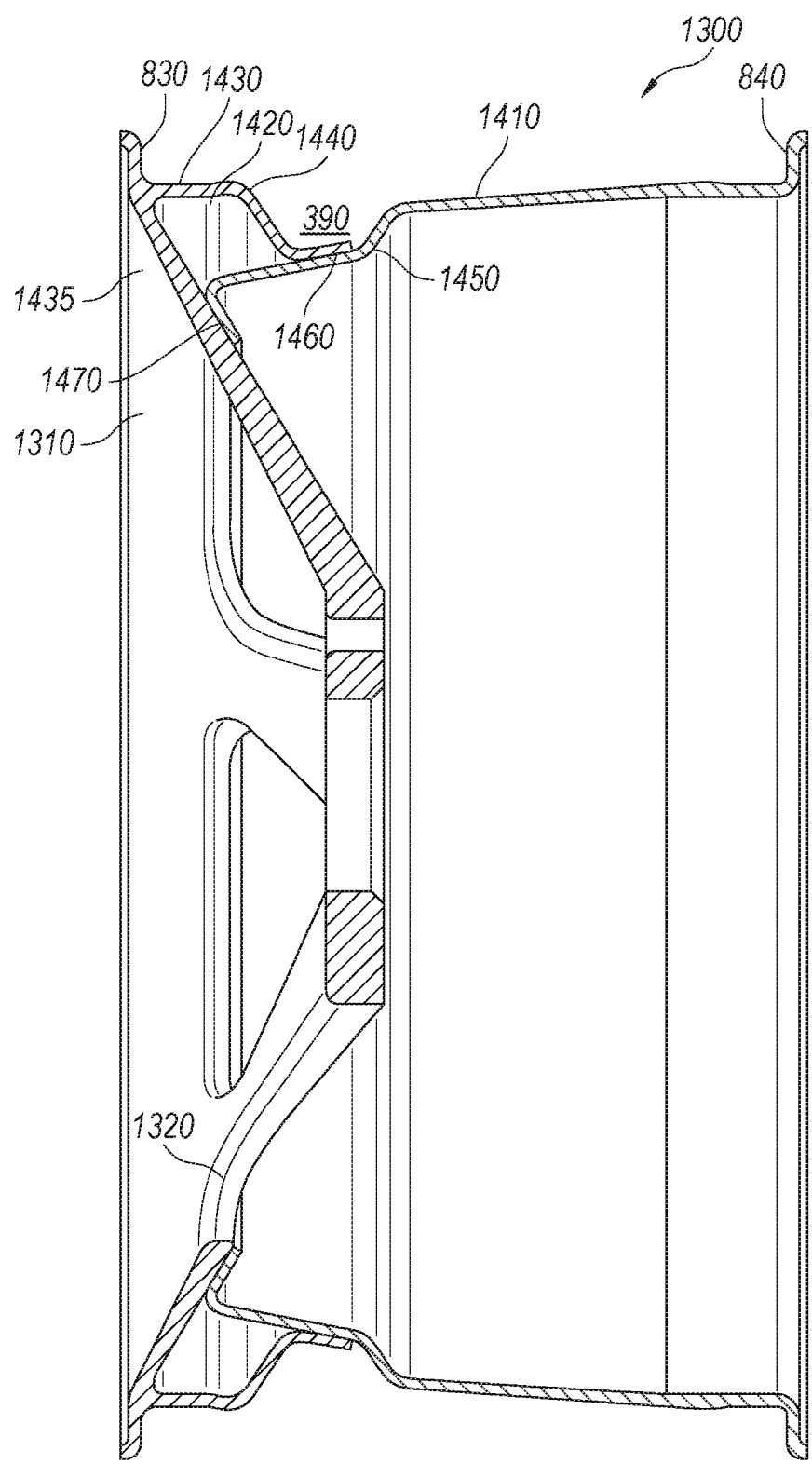
FIG. 14 illustrates a sectional view of the wheel assembly taken along Line 14-14 in FIG. 13.

FIG. 14 illustrates a sectional view of the wheel assembly 1300 shown in FIG. 13, taken across the plane defined by 14-14 shown in FIG. 13. The outer hoop structure 1310 (which includes spokes 1320) and the inner hoop 1410 are shaped such that when they are joined together in the wheel assembly 1300, they form a circumferential box structure

1420. The box structure 1420 is formed from overlapping concentric circumferential projections extending from the outer hoop structure 1310 and the inner hoop 1410. For example, the outer hoop structure 1310 may have a circumferential first projection 1430 that may be generally similar to the first projection 410 of the outer hoop 130 illustrated in FIGS. 1-6. Specifically, the first projection 1430 of the outer hoop structure 1310 may extend generally horizontally or inwardly from an outer or curb-side face of a radially outward portion 1435 of the outer hoop structure 1310. The first projection 1430 may have a circumferential bend 1440 toward a center region of the wheel assembly 1300. The first projection 1430, including the bend 1440, form a radially outward portion of the box structure 1420. A surface of the first projection 1430 forms a part of a radially outward surface of the wheel assembly 1300.

The inner hoop 1410 may have a circumferential second projection 1450 extending outwardly toward the curb-side of the wheel assembly 1300. The second projection 1450 forms part of a radially inward portion of the box structure 1420. When the outer hoop structure 1310 and the inner hoop 1410 are brought together to form the wheel assembly 1300, the first projection 1430 may be circumferentially attached to the second portion 1450 at a joint 1460, which may include attachment similar to attachment used in other joints (for example, 450) described herein.

The radially outward portion 1435 of the outer hoop structure 1310 forms an outboard or curb-side portion of the box structure 1420. A face of the radially outward portion 1435 is attached to the second projection 1450 at a joint 1470, which may be similar to other joints described herein. Accordingly, when the outer hoop structure 1310 and the inner hoop 1410 are brought together, they form a generally two-piece wheel assembly 1300 with a box structure 1420 for improved structural qualities. Circumferential bead flanges 830, 840 retain a tire on the wheel assembly 1300.

The outer hoop structure 1310 and the inner hoop 1410 may be formed from a carbon fiber composite material. In some embodiments, the elements forming the wheel assembly 1300 may be formed from other materials, including other composite materials or metal alloys, for example. In some embodiments, the outer hoop structure 1310 and the inner hoop 1410 may be formed from the same materials, or in other embodiments, they may be formed from different materials.

The foregoing embodiments of the technology provide for easier and more cost-efficient manufacturing processes. For example, the rim barrels and hoops may be made in various widths to provide combinations that yield various overall wheel widths and offsets without the need for a specific wheel tool for each overall wheel size. The center may be formed with various offsets to accommodate various vehicle fitments, or it may be formed with various styles to accommodate aesthetic needs.

The foregoing embodiments of the technology may also provide a decrease in rotational inertia of approximately 40 percent to 50 percent as compared to a traditional aluminum wheel. Such a decrease in rotational inertia can enable improved vehicle fuel efficiency, acceleration capability, and perceived throttle response time. In addition, overall wheel weight may be decreased by approximately 20 percent to 40 percent as compared to a traditional aluminum wheel. Such a weight decrease may improve ride quality and suspension compliance. In addition, the box structures of the foregoing embodiments provide improved stiffness without a significant weight penalty.

From the foregoing, it will be appreciated that specific embodiments of the disclosed technology have been described for purposes of illustration, but that various modifications may be made without deviating from the technology, and elements of certain embodiments may be interchanged with those of other embodiments. For example, in some embodiments, the projections (such as 410, 430, 440) may have different shapes, orientations, or bends (such as 420) to form the box structure (such as 330). Accordingly, the box structures disclosed herein may have various cross-sectional shapes (for example, square, triangular, other polygonal shapes, or rounded shapes). In some embodiments, a drop region (for example, 390) may not be included. In some embodiments, an inner hoop (for example, 140) and an outer hoop (for example, 130) in a rim barrel assembly (for example, 120) may be formed from different materials to make use of specific properties of each material in the same wheel. For example, in some embodiments, an outer hoop formed with thermoplastic may have improved impact resistance, while an inner hoop formed from thermoset polymer (with a pre-preg reinforcing material in some embodiments) may have improved stiffness.

In some embodiments, elements of the present technology may be joined using joints other than parallel joints. In various embodiments, elements could be bonded with adhesive or attached with fasteners, or both. In some embodiments, elements may be bonded together using a bonding material painted or otherwise applied to mating surfaces. In some embodiments, elements may be bonded together using an injection bonding method. An injection bonding method may include placing the mating elements adjacent to one another with a small gap therebetween, while a bonding material is injected through one or more holes in the elements so that the bonding material fills the gap. In some embodiments, a witness hole in one or more parts may be used to ensure that the material has filled the gap to satisfy assembly requirements.

In some embodiments, various parts of the wheel assemblies (for example, hub portions or parts of the rim barrel assemblies) may be coated with a material to protect against environmental factors. For example, parts of the wheel assemblies may be coated with a layer of ultraviolet (UV) protective material, or with a material that resists corrosion or damage from road salt or other chemicals found on driving surfaces. In several embodiments of the technology, various aesthetic or functional designs may be used, including different numbers, shapes, or arrangements of spokes. In some embodiments, a hub may not have spokes (for example, the hub may be solid or dish-like). In any embodiments involving elements fastened, adhered, or otherwise attached together at one or more joints, such joints may be omitted such that elements are integrally formed as a single or unitary element.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:
1. A wheel comprising:
a first hoop having a first circumferential projection;
a second hoop having a second circumferential projection; and a hub portion;
  wherein at least part of the hub portion is positioned between the first circumferential projection and the second circumferential projection; and
  wherein the first circumferential projection and the second circumferential projection form at least part of an enclosed box structure positioned about a circumference of the wheel.

2. The wheel of claim 1, further comprising a third circumferential projection extending in an inboard direction from the first hoop and having a circumferential bend toward a center region of the wheel, the third circumferential projection forming part of the box structure.

3. The wheel of claim 2, wherein the third circumferential projection is attached to the second circumferential projection.

4. The wheel of claim 1, wherein the first hoop and the second hoop each comprise a composite material, and the hub portion comprises a metal alloy.

5. The wheel of claim 1, wherein the hub portion is fastened between the first circumferential projection and the second circumferential projection with at least one pin or bolt.

6. The wheel of claim 1, wherein the part of the hub portion positioned between the first circumferential projection and the second circumferential projection comprises at least one spoke.

7. A wheel comprising:
  a hub portion;
  a first hoop comprising a first circumferential projection, the first hoop further comprising a flange portion extending radially inwardly along at least part of the hub portion; and
  a second hoop comprising a second circumferential projection;
  wherein the first circumferential projection and the second circumferential projection form at least part of an enclosed box structure about a circumference of the wheel; and
  wherein the hub portion is mounted to the flange portion.

8. The wheel of claim 7, wherein the first circumferential projection extends inwardly from an outboard region of the wheel and has a circumferential bend towards a center region of the wheel.

9. The wheel of claim 7, wherein the first hoop and the second hoop each comprise a composite material, and the hub portion comprises a metal alloy.

* * * * *